United States Patent [19]

Lavallee et al.

[11] Patent Number: 5,399,951
[45] Date of Patent: Mar. 21, 1995

[54] ROBOT FOR GUIDING MOVEMENTS AND CONTROL METHOD THEREOF

[75] Inventors: Stéphane Lavallee, Grenoble; Jocelyne Troccaz, Eybens, both of France

[73] Assignee: Universite Joseph Fourier, Cedex, France

[21] Appl. No.: 59,407

[22] Filed: May 11, 1993

[30] Foreign Application Priority Data

May 12, 1992 [FR] France .................. 92 06150

[51] Int. Cl.$^6$ .................. G05B 19/10; G06F 15/00
[52] U.S. Cl. .................. 318/567; 318/568.13; 901/46; 364/413.01; 395/95; 606/167
[58] Field of Search .................. 364/413.01, 413.13, 364/413.14, 413.15, 413.16, 413.19; 395/88, 94, 95, 96, 97; 606/32, 53, 167, 172; 318/568.13, 573, 568.14, 568.11, 574, 628, 568.1, 567; 901/19, 23, 46, 47, 27

[56] References Cited

U.S. PATENT DOCUMENTS

| | | | |
|---|---|---|---|
| 4,367,532 | 1/1983 | Crum et al. | 318/628 |
| 4,429,266 | 1/1984 | Tradt | 318/632 |
| 4,675,502 | 6/1987 | Haefner et al. | 318/574 |
| 4,831,232 | 5/1989 | Anderson et al. | 318/577 |
| 4,931,711 | 6/1990 | Naruo . | |
| 5,047,700 | 9/1991 | Szakaly | 318/568.1 |
| 5,062,755 | 11/1991 | Lawrence et al. | 901/20 |
| 5,083,073 | 1/1992 | Kato | 318/577 |
| 5,086,401 | 2/1992 | Glassman et al. . | |
| 5,142,930 | 9/1992 | Allen et al. . | |

FOREIGN PATENT DOCUMENTS

0326768A3  8/1989  European Pat. Off. .

OTHER PUBLICATIONS

"Redundant Consistency Checking in a Precise Surgical Robot" by Russell H. Taylor et al., Annual International Conference of the IEEE Engineering in Medicine and Biology Society, vol. 12, No. 5, 1990, pp. 1933-1935.

"The development of a surgeon robot for prostatectomies" by B. L. Davies et al., Proceedings of the Institution of Mechanical Engineers, vol. 205, No. H1, 1990 Part H, London, GB, pp. 35-38.

*Primary Examiner*—William M. Shoop, Jr.
*Assistant Examiner*—John W. Cabeca
*Attorney, Agent, or Firm*—Lowe, Price, LeBlanc & Becker

[57] ABSTRACT

A robot for guiding movements has its power provided by an operator who handles a tool integral with the robot. Like a conventional robot, the guiding robot has several axes respectively associated with rotation sensors that are connected to a computer system memorizing a path to be followed. When the operator moves the tool beyond the stored path, blocking devices, controlled by the computer system and replacing the robot's motors, prevent the tool from continuing to depart from the path. Thus, at any time, the operator can move the tool within the stored path only. The blocking devices are passive, that is, they are such that they can only resist to a movement but cannot generate a movement, which prevents the occurrence of any uncontrolled movement.

10 Claims, 2 Drawing Sheets

ROBOT FOR GUIDING MOVEMENTS AND CONTROL METHOD THEREOF

BACKGROUND OF THE INVENTION

1. Field of the Invention

The present invention relates to robots controlled by a computer system in order to urge a tool, integral with a robot's arm, to follow a memorized path.

2. Discussion of the Related Art

Many robots are capable of moving a tool, such as milling cutters, torch welders, etc., within a prememorized precise path. In order to move a tool according to n degrees of freedom, a robot must have at least n axes. A degree of freedom corresponds to a translation or rotation movement in accordance with an axis of a three-dimensional referential system. With 6 degrees of freedom, all the translation and rotation combinations of a tool are possible (the tool can be positioned anywhere, according to any orientation within a determined range of action of the robot). The relation between the articulation variables (rotation angles of the robot's axes) and the position and orientation of the tool is given by:

$$P = f(A)$$

where P is a vector whose components represent the position coordinates $x_i$ (i=1 ... 3) and orientation coordinates $r_i$ (i=1 ... 3) of the tool, A is a vector whose components represent the articulation variables $a_j$ (j=1 ... 6), and f is a vector function.

A slight variation dA of the articulation variables about vector A is then associated with a slight variation dP of the position vector by the relation $$dP = [J(A)]dA,$$

where [J(A)] is a Jacobian matrix whose coefficients are functions of the components of vector A.

Considering the accuracy of trajectories obtained with robots, it would seem advantageous to use them in the surgical field. However, when the present robots are operating, they exhibit hazards that render them unsuitable for surgical treatments. Indeed, in case of failure of the control circuit of the robot's motor, or simply because of power supply trouble, such as a brief current interruption, the robot could make an uncontrolled movement of large magnitude and high power that would endanger a patient withstanding a surgical act determined by the robot.

Nowadays, robots are used in the surgical field only for prepositioning and are blocked during the surgical act. For example, a neuro-surgical act consists in inserting a needle into the brain at a very precise spot. To achieve this purpose, one uses a robot that positions a cylinder guiding a needle in a very precise way with respect to the patient's head, using a system allowing to detect the position of the head. Once the guiding cylinder is positioned (far enough from the patient so that he cannot be reached by an uncontrolled movement of the robot), the robot's axes are blocked and its power supply is turned off. Then, the surgeon inserts the needle in the desired way into the guiding cylinder. Thus, in the surgical field, the use of robots is presently limited to the detection of a precise initial position.

SUMMARY OF THE INVENTION

An object of the invention is to provide a new design of robots capable of urging a tool to follow precise paths without any risk of uncontrolled movements.

Another object of the invention is to provide a robot whose movements are directly controlled by an operator without resorting to forces other than the one provided by the operator.

Another object of the invention is to provide a robot capable of passively guiding the operator's movements.

These objects are achieved with a robot operable to guide movements and whose power is provided by an operator who handles a tool integral with time robot. Like a conventional robot, the guiding robot has several degrees of freedom (or axes), respectively associated with movement sensors that are connected to a computer system in which is stored a path to be followed. When the operator moves the tool beyond the stored path, suitable blocking devices, controlled by the computer system and replacing the robot's motors, prevent the tool from continuing to move beyond its predetermined path. Thus, at any time, the operator can move the tool only according to the stored path. The blocking devices are passive, that is, they are such that they can only resist to a movement but cannot generate a movement, which prevents the occurrence of any uncontrolled movement.

The invention more particularly relates to a robot having several degrees of freedom, each associated with a movement sensor that is connected to a computer system calculating, from information provided by each sensor, the position of a tool integral with an arm of the robot, the computer system further memorizing a path. According to the invention, the tool is handled by an operator and the robot includes a device for determining the direction of the movement associated with each degree of freedom. The device authorizes movements according to the associated degree of freedom in a predetermined direction, the opposite direction, both directions, or no direction at all, as a function of signals provided by the computer system.

According to an embodiment of the invention, the device for determining the direction allows movements according to the associated degree of freedom only in a direction suitable to urge the tool to penetrate into an authorized area, that may be limited to a single point, if the tool moves beyond the area boundary.

According to an embodiment of the invention, the device for determining the direction allows movements according to the associated degree of freedom only in a direction suitable to bring the tool closer to the stored path according to an oblique direction.

According to an embodiment of the invention, the device for determining the direction includes two free wheels having an opposite rotation direction and each including a means controlled by the computer system coupled to an axis constituting the associated degree of freedom.

According to an embodiment of the invention, each coupling means includes a clutch controlled by a solenoid.

According to an embodiment of the invention, the robot includes, for each degree of freedom, a speed limiting means, controlled by the computer system.

The invention also provides a method for controlling a robot having several degrees of freedom and provided with movement sensors, operable to urge a tool, integral with a robot's arm, to follow a path memorized in a computer system, and includes the following steps: manually moving the tool; calculating the current position of the tool and, if required, determining as a function of this position a preferential direction to be followed by the tool; and authorizing a movement according to each degree of freedom of the robot only in a direction allowing the operator to move the tool according to the preferential direction.

According to an embodiment of the invention, the movement direction for each degree of freedom is determined by the sign of a component according to this degree of freedom of a vector of the space of movements according to the degrees of freedom, corresponding to a vector indicating, in the space of positions and orientations of the tool, the preferential direction.

According to an embodiment of the invention, the preferential direction is perpendicular to the boundary of an authorized area, that can be limited to a single point, if the tool moves beyond the boundary.

According to an embodiment of the invention, the preferential direction is comprised between the perpendicular and the tangent to the stored path.

The foregoing and other objects, features, aspects and advantages of the invention will become apparent from the following detailed description of the present invention which should be read in conjunction with the accompanying drawings.

DETAILED DESCRIPTION

Figure 1:
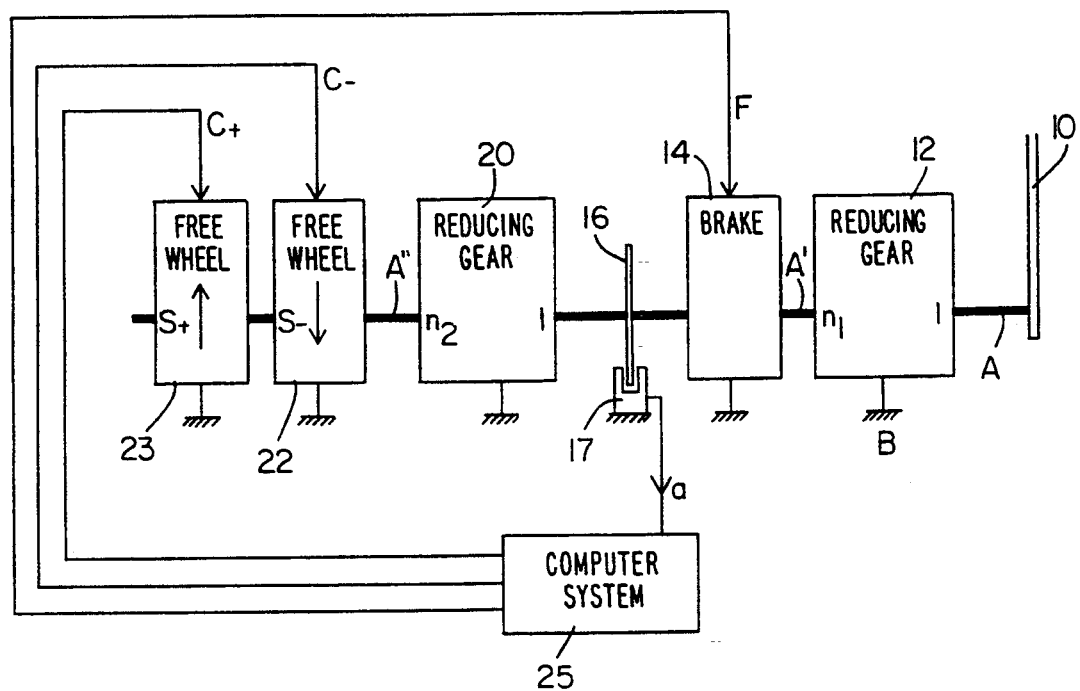
FIG. 1 shows an embodiment of a robot's axis according to the invention.

FIG. 1 shows an axis A of a robot according to the invention. Axis A is for example integral with an arm 10 and connected to the output of a first reducing gear 12 integral with a framework B forming a portion, for example, of a second arm of the robot. The input axis A' of the reducing gear is connected to a brake 14 controlled by a signal F, to a position sensor such as a coding wheel 16 associated with an optical sensor 17 providing a rotation angle signal a, and to the output of a second reducing gear 20. A third reducing gear can be provided between the brake and the position sensor.

The elements described up to now are conventionally found in robot's articulations. Conventionally, the input axis A" of reducing gear 20 is connected to a motor.

According to an embodiment of the invention, axis A" is connected to two disengageable free wheels 22, 23. The free wheel 22 allows the rotation of axis A, through reducing gears 12, 20, in only one direction S− when a control signal C− is active. The free wheel 23 allows the rotation of the axis only in the opposite direction S+ when a control signal C+ is active. When the control signal C associated with a free wheel is OFF, the free wheel allows axis A to rotate in both directions.

With this configuration, axis A provides four functions:

freely rotating in directions S+ and S− when signals C+ and C− are OFF;

rotating only in direction S+ when signal C+ is ON and signal C− OFF;

rotating only in the opposite direction S− when signal C− is ON and signal C+ is OFF; and remaining blocked if signals C+ and C− are ON.

Brake 14 provides either one of two different functions, that is, limiting the rotation speed of axis A to a value predetermined by signal F, or applying a braking force predetermined by signal F. Brake 14 is normally blocked so as to block the robot in case of power failure. Similarly, for double safety, the disengageable free wheels 22, 23 are normally engaged (signals C+ and C− are ON when the power is turned off). In order to be able to move the robot in case of power failure, the brakes and free wheels are designed so as to be manually unblockable.

As an example of a normally-engaged disengageable free wheel is a free wheel coupled to a clutch controlled by a solenoid during the disengagement phase.

A computer system 25 stores data such as points of a path or of a surface. As a function of signals a provided by the rotation sensors 16, 17 of each robot's axis, the computer system 25 provides control signals C+ and C− from the free wheels and signals F from the brakes of each robot's axis in order to carry out the functions that are described hereinafter.

A robot according to the invention is designed so as to operate according to two main modes, hereinafter referred to as "region mode" and "oriented tracking mode". The "region mode" allows an operator to move a tool within an area delineated by surfaces. The oriented tracking mode forces the operator to closely follow a path in a predetermined direction.

A robot according to the invention can be used by a surgeon who has to make, for example, a precise scalpel stroke. The scalpel stroke is then stored as a path. During the approach phase toward the path, the surgeon can first freely move the scalpel until a predetermined distance from the patient; the robot is then used according to the region mode defining a large authorized area. Then, the surgeon must engage the scalpel in a funnel-shaped area that ends at the initial portion of the path. The path can then be tracked according to the oriented tracking mode or the region mode by defining a narrow channel area about the path.

Figure 2A:
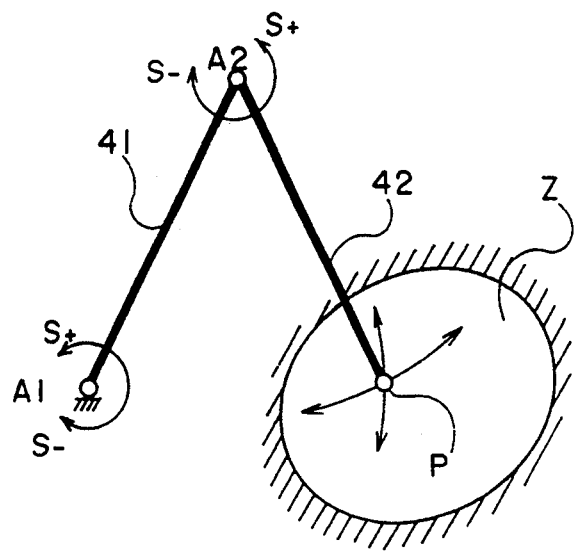
FIGS. 2A and 2B show two positions of a two-axis robot according to the invention, useful for illustrating its operation.
Figure 2B:
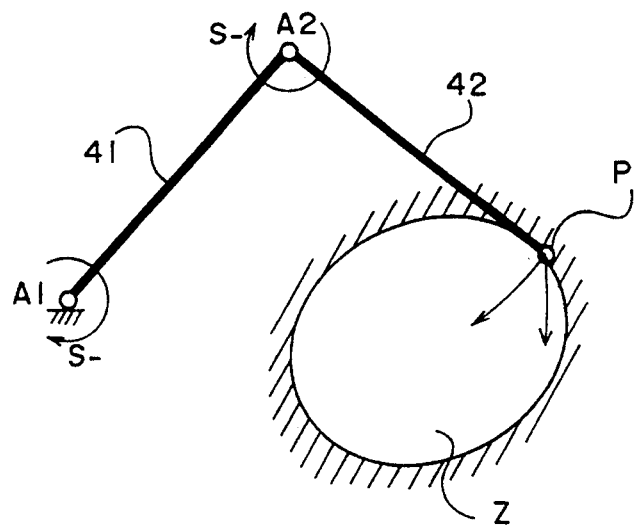

FIGS. 2A and 2B illustrate two positions of a two-axis robot controlled according to the region mode in order to force a point P of the robot to stay in an area Z. Area Z is bidimensional and delineated by boundary curves memorized in computer system 25. The robot includes a first axis $A_1$ according to the invention, articulating a first arm 41 on a framework. A second arm 42 is articulated at the free end of arm 41 by a second axis $A_2$ according to the invention. Point P is disposed at the free end of arm 42.

The computer system constantly calculates the position of extremity P by using the information provided by the sensors of axes $A_1$ and $A_2$ as well as the lengths of arms 41 and 42 in accordance with the above-mentioned relation P=f(A).

In FIG. 2A, extremity P is within the authorized area Z, and axes $A_1$ and $A_2$ are controlled so as to allow free rotation in both directions S+ and S−. Thus, extremity P can freely move in any direction.

In FIG. 2B, extremity P moves beyond the boundary of area Z. Then, each axis $A_1$ and $A_2$ is controlled so as to authorize a respective rotation only in a direction (S− for both axes) adapted to urge extremity P to penetrate into area Z.

With the above-described operation, an operator can move the extremity P only within area Z; any attempt to move beyond this area being immediately detected and stopped by the control of the appropriate free wheels of axes $A_1$ and $A_2$.

A real control of the robot requires a response time (time for calculating the positions and reactions of the disengageable free wheels) that does not allow the robot to immediately detect whether the point P to be controlled has reached a limit position and to instantaneously react. Thus, depending on the moving speed of point P, the latter can, before detection, move beyond the limit position. Here, the role of the speed limiter 14 clearly appears. By limiting the speed to a known value, the response time being known, the maximum overrun value is thus known. Therefore, this overrun can be adjusted by regulating the limit speed.

For the sake of simplicity, FIGS. 2A and 2B represent a plane case. In a real case, the boundary area Z is three-dimensional if it is desired to check the position of a point, and is six-dimensional if it is also desired to check the orientation of a tool.

Thus, more generally, the "region mode" consists in memorizing boundary surfaces within which the tool is allowed to freely move. Preferably, the boundary surfaces are divided into simple surfaces, such as planes, cylinder portions, sphere portions, etc. The computer system 25 then constantly calculates the minimum distance between the tool and a boundary surface. If the tool reaches or moves beyond a boundary surface, the robot's axes must be controlled so that the tool can be moved only inwardly, with respect to the boundary surface.

If it is desired to control the movement of a tool according to n degrees of freedom ($n \leq 6$), the boundary surfaces are surfaces having a dimension n-1 (hypersurfaces of an n-dimension space). Hereinafter, terms such as "point", "position", "path", etc. relate to an n-dimension space, that is, for example, a point defines a tool's position and orientation. In order to control the various axes of the robot when it moves beyond a boundary hypersurface, it can be proceeded as follows.

First, one determines the normal to the boundary surface that is defined as the line intersecting point P corresponding to the current position of the tool and point H of the boundary surface, the closest to point P. One calculates from this normal line a vector N oriented toward the inside of the boundary surface. Then, relation $$A_N = [J^{-1}]N$$

is applied, where $[J^{-1}]$ is the reverse matrix of the above-mentioned matrix $[J]$, associating a position variation dP with a variation dA of the articulation variables A.

Then, a set $A_N$ of rotation angle values is obtained;

if a value is positive, the rotation of corresponding axis is allowed only in a positive direction, if a value is negative, the rotation of corresponding axis is allowed only in a negative direction, if a value is zero, the corresponding axis is blocked.

The number n of degrees of freedom of the robot to be effectively controlled according to the invention can be smaller than the total number. In that case, the remaining degrees of freedom are blocked or free, for example if it is desired to prevent or allow, respectively, a continuous free rotation of the tool about an axis.

Figure 3:
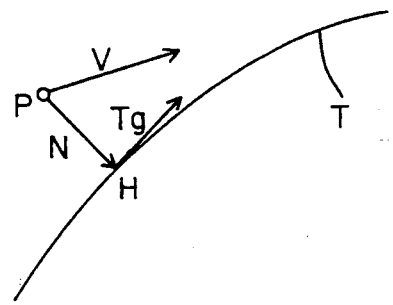
FIG. 3 shows a graph which is useful for explaining an aspect of the invention.

FIG. 3 shows how to proceed according to the oriented tracking mode to follow a stored path T, also considered in an n-dimension space. The following steps are carried out in an infinite loop:

calculating the current position P of the tool;

determining a vector N intersecting position P, perpendicular to the path, and oriented toward the path;

determining a vector Tg orthogonal to vector N (tangent to the path) and oriented in the desired direction;

calculating vector V which is a linear combination having positive coefficients of vectors N and Tg; and calculating a set $A_V$ corresponding to the rotation angle values of the robot's axes by applying the reverse Jacobian matrix $[J^{-1}]$ to vector V.

Thus, a set $A_V$ of angle values is obtained. One applies to this set of values the above rules defined for set $A_N$. As a result, the tool can be moved, from the current position according to the desired direction (Tg) toward the path (N).

The coefficients associating vector V with vectors N and Tg depend on the distance between position P and the path. So, if the distance is significant, the direction of vector V is close to that of vector N; if the distance is small, the direction of vector V is close to that of vector Tg.

According to a variant of the described methods allowing to reduce the calculation time, the boundary surfaces and paths are previously stored in the space of articulation variables. To achieve this purpose, formula $A = f^{-1}(P)$, where $f^{-1}$ is the reverse function of the above-mentioned function f, is applied to suitably selected points P of surfaces and paths considered in the position and orientation space (missing points can be interpolated, if required). Therefore, it is unnecessary, in order to determine the rotation direction of the axes, to calculate in real time matrices J and their respective reverse matrices. The axis rotation directions are then directly provided by the signs of the components of vectors N (for the region mode) and V (for the oriented tracking mode), these vectors being determined in accordance with the above-mentioned steps applied in the articulation variable space.

A robot according to the invention can also be used to enable an operator to move a tool toward a precise position $P_0$. A set of values $a0_j$ of the rotation angles of the axes corresponds to position $P_0$. The rotation direction of each axis $A_j$, as long as the position is not reached, is determined by the sign of expression $a0_j - a_j$, where $a_j$ is the current value of the rotation angle of axis $A_j$. This mode of utilization can be compared with the region mode whose authorized area is limited to the point $P_0$ to be reached.

In order to facilitate tracking of the path by the operator, he can be provided with position information given in various ways (sound, display). It is possible, for example, to display on a screen the stored path as well as the current position of the tool. Additionally, in order to provide a stronger guiding feeling, brakes 14 can be controlled so that their braking force is proportional, for example, to the difference between the position and the path.

A robot according to the invention can include an assembly of light arms for ensuring the precise path and an assembly of strong arms for ensuring the approach phase to the robot, the strong arms being blocked, if required with respect to a device detecting the position of a patient, once the approach phase is completed.

The control computer system 25 can be positioned with respect to the patient with systems known per se, such as those already used in neuro-surgery to position a cylinder for guiding a needle with respect to a patient's head.

The invention has been described in relation with robots having rotation axes. Of course, it similarly applies to robots including translation axes.

Those skilled in the art will be able to program the computer system 25 in order to suitably control the axes according to the invention as a function of the calculation of the position and the stored path to be complied with. They will also be able to select or fabricate disengageable free wheels.

As is apparent to those skilled in the art, various modifications can be made to the above disclosed preferred embodiments. They will be able to find many control methods equivalent to the methods described. For example, to track a path T, from the position shown in FIG. 2A, one of the axes (for example $A_1$) can be blocked and another axis ($A_2$) can remain free in order to move extremity 43 in an arc of a circle up to limit T2. When limit T2 is reached, axis $A_2$ is blocked and axis $A_1$ is released so as to move extremity 43 up to limit T1 where axis $A_1$ is blocked again and axis $A_2$ is released.

Various applications, not described, can be found for a robot according to the invention, especially in the reeducation field, for motion learning, etc., the described tool being then, for example, a strap fixed to a limb.

We claim:

1. A manually powered robot comprising:
   movement sensors associated respectively to degrees of freedom of the robot, each degree of freedom having first and second directions;
   a tool fixed to an arm of the robot, said tool being exclusively moved by an operator;
   a computer for storing a path, calculating the position of said tool from the information given by the sensors, and providing for each degree of movement a control signal having four possible values as a function of the position of the tool relative to said path;
   a movement control device associated to each degree of freedom for:
   allowing total freedom of movement about the degree of freedom if the associated control signal has a first value;
   allowing movement in only the first direction of the degree of freedom if the associated control signal has a second value;
   allowing movement in only the second direction of the degree of freedom if the control signal has a third value; and
   allowing no movement along the degree of freedom if the control signal has a fourth value.

2. The robot of claim 1, wherein each movement control device allows movements about the associated degree of freedom only in a direction suitable to allow the tool to penetrate into an authorized area, if said tool moves beyond the area boundary.

3. The robot of claim 1, wherein each movement control device allows movements about the associated degree of freedom only in a direction suitable to allow the tool to approach said stored path.

4. The robot of claim 1, wherein each movement control device includes two free wheels having an opposite rotation direction and each free wheel including a means controlled by the computer system for coupling the free wheel to an axis constituting the associated degree of freedom.

5. The robot of claim 1, wherein each coupling means includes a clutch controlled by a solenoid.

6. The robot of claim 1, including, for each degree of freedom, a speed limiting means, controlled by the computer system.

7. A method for controlling a robot with an arm having several degrees of freedom associated with respective movement sensors and having a tool fixed to said arm, comprising the following steps:
   storing a path to be followed by the tool in a computer system;
   moving the tool, wherein said movement is manually performed by an operator;
   calculating the current position of the tool and determining as a function of this position a preferential direction, corresponding to said path, to be followed by the tool; and
   authorizing a movement about each degree of freedom of the robot only in a direction allowing the operator to move the tool in the preferential direction.

8. The control method of claim 7, wherein the movement direction about each degree of freedom is determined by the sign of a component along said degree of freedom of a vector in a space whose coordinate system is constituted by the degrees of freedom, corresponding to a vector indicating said preferential direction in a position and orientation space of the tool.

9. The control method of claim 7, wherein said preferential direction is the normal to the boundary of an authorized area if the tool moves beyond the boundary.

10. The control method of claim 7, wherein said preferential direction (N, V) is comprised between the normal (N) and the tangent (Tg) to said stored path.

* * * * *